(12) United States Patent
Larsen

(10) Patent No.: US 6,601,818 B1
(45) Date of Patent: Aug. 5, 2003

(54) TILTING MOUNT WITH INTEGRAL FLANGE

(75) Inventor: Atle Larsen, Erie, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/689,536

(22) Filed: Oct. 12, 2000

(51) Int. Cl.$^7$ .............................. F16F 7/00; F16M 11/00
(52) U.S. Cl. ................. 248/621; 267/141.5; 267/141.7; 248/158; 248/632
(58) Field of Search .............................. 248/615, 618, 248/622, 632, 678, 677, 158, 160, 188, 188.1, 357, 501; 267/140.3, 140.4, 140.5, 141, 141.3, 141.4, 141.5, 141.7

(56) References Cited

U.S. PATENT DOCUMENTS

| | | | | |
|---|---|---|---|---|
| 2,941,766 A | * | 6/1960 | Van Ranst | 267/141.7 |
| 3,028,665 A | * | 4/1962 | Hirst | 29/450 |
| 3,913,518 A | * | 10/1975 | Kaplan | 116/63 C |
| 3,975,007 A | * | 8/1976 | Chorkey | 267/152 |
| 4,027,843 A | | 6/1977 | Thompson | 248/22 |
| 4,067,525 A | * | 1/1978 | Allen | 248/632 |
| 4,858,880 A | | 8/1989 | Durand | 248/635 |
| 4,890,886 A | | 1/1990 | Opsvik | 297/313 |
| 4,936,558 A | * | 6/1990 | Orlandi | 267/292 |
| 4,979,718 A | | 12/1990 | Bauer et al. | 248/631 |
| 5,044,587 A | | 9/1991 | Degen | 248/158 |
| 5,058,867 A | * | 10/1991 | Hadano et al. | 267/141.3 |
| 5,131,615 A | | 7/1992 | Hosan et al. | 248/161 |
| 5,415,590 A | * | 5/1995 | Steingraber et al. | 473/103 |
| 5,740,997 A | | 4/1998 | Van Wieran | 248/404 |
| 6,305,674 B1 | * | 10/2001 | Koivurova | 267/136 |

* cited by examiner

Primary Examiner—Ramon O. Ramirez
Assistant Examiner—Jon Szumny
(74) Attorney, Agent, or Firm—Michael M. Gnibus; Edward F. Murphy, III

(57) ABSTRACT

A tilting mount for controlling the angular tilting or rocking displacement of a support member. The tilting mount comprises an outer elastomeric member and an inner sleeve with an annular flange. An end of the support member is inserted in a bore that extends through the sleeve. The mount is adapted to be seated in a base, and a cup substantially overlays the mount. As the support member is tilted and displaced from its vertical position, diagonally disposed portions of the mount member are compressed between the flange and both the cup and base in order to facilitate and control the angular displacement of the support member. The elastomeric member provides snubbing that limits the angular displacement of the support member.

27 Claims, 5 Drawing Sheets

FIG. 1.

TILTING MOUNT WITH INTEGRAL FLANGE

FIELD OF THE INVENTION

The invention relates to a tilting mount for controlling the angular or rocking displacement of a support member relative to a base. More particularly the invention relates to a tilting mount that joins the support member and base where the mount comprises an outer elastomeric member and an inner sleeve having an integral flange member, and whereby the angular displacement of the support member is controlled by further compressing diagonally opposed portions of the elastomeric member between the base and a rigid cup that overlays the elastomeric member.

BACKGROUND OF THE INVENTION

Tilting mounts are typically used in chairs such as those used as office furniture and such mounts facilitate and control the fore/aft and side-to-side rocking, tilting or angular displacement of a support member that joins the seat and base.

Known mounts for facilitating and controlling the angular displacement of the support member typically include complex mechanisms and a large number of component parts to produce the desired angular displacement and to limit such displacement to a predetermined acceptable range of motion. Due to the complexity of such known tilting mounts, the prior art mounts are typically difficult and expensive to manufacture, assemble and repair; and the manufacture, assembly, and repair of such prior art mounts is time consuming.

Prior art tilting mounts are subjected to both tensile and compressive forces. The tensile forces can significantly reduce the useful life of the mount. The tensile forces are frequently caused by the rigid connections between one or more of the mount component parts and an outer mount housing. In mounts with such connections, the mount is continuously subjected to tension forces.

In known rocking or tilting mounts, mechanical stops are used to limit the angular displacement or rocking angle of the seat support member. By their nature the mechanical stops and also the mounts themselves have a limited useful life, and over time the mechanical stops and mounts wear out. Frequently, the prior art tilting mounts do not include a backup means for limiting motion of the mount in the event the mechanical stop fails. Without backup means the possible support member displacement angle may become unlimited or the support member may become disconnected from the mount.

The foregoing illustrates limitations known to exist in present devices and methods. Thus, it is apparent that it would be advantageous to provide an alternative mount directed to overcoming one or more of the limitations set forth above. Accordingly, a suitable alternative tilting mount is provided that eliminates mount tension forces, and includes a simple mount design, means for limiting angular displacement of the support member and means for preventing disconnection of the support member and base in the event of a mount failure, as well as other features more fully disclosed hereinafter.

SUMMARY OF THE INVENTION

In one aspect of the present invention this is accomplished by providing a tilting mount that eliminates complex mechanisms of prior art mounts by providing a mount that comprises a tubular sleeve member having an outer wall and an outwardly directed flange along the outer wall, and also includes an elastomeric member that substantially covers the sleeve member, the elastomeric member has an outer surface and a number of protuberances along the outer surface. The mount may be included as part of a support assembly that includes a base defining a cavity adapted to receive the mount, and a rigid cup that overlays the mount and precompreses the elastomeric member when the cup is fastened to the base. A moveable member is supported by the mount.

The mount is not connected to either the cup or base and is maintained entirely in compression. The mount is not subjected to tension either as assembled or when the support member experiences angular displacement relative to the base. Therefore the mount of the present invention is likely to have a longer useful life than other prior art tilting mounts.

As the member is displaced angularly, the compressive forces in diagonally opposed portions of the elastomeric member are increased while other elastomeric portions of the mount are moved out of compression. Angular displacement of the member is limited by snubbing of the elastomeric member between the inner sleeve and the base cavity.

The cup member has an upper opening that defines a minimum diameter and the sleeve flange defines a maximum diameter, and in all instances, the maximum diameter is greater than the minimum diameter. If the mount fails, an interference between the maximum and minimum diameters is created preventing egress of the sleeve and support member from the cup. The interference between the maximum and minimum diameters prevents the support member from disconnecting from the base. Additionally, the angular displacement of the support member is limited by the interference.

The foregoing and other aspects will become apparent from the following detailed description of the invention when considered in conjunction with the accompanying drawing figures.

DETAILED DESCRIPTION OF THE PREFERRED EMBODIMENT

Figure 1:
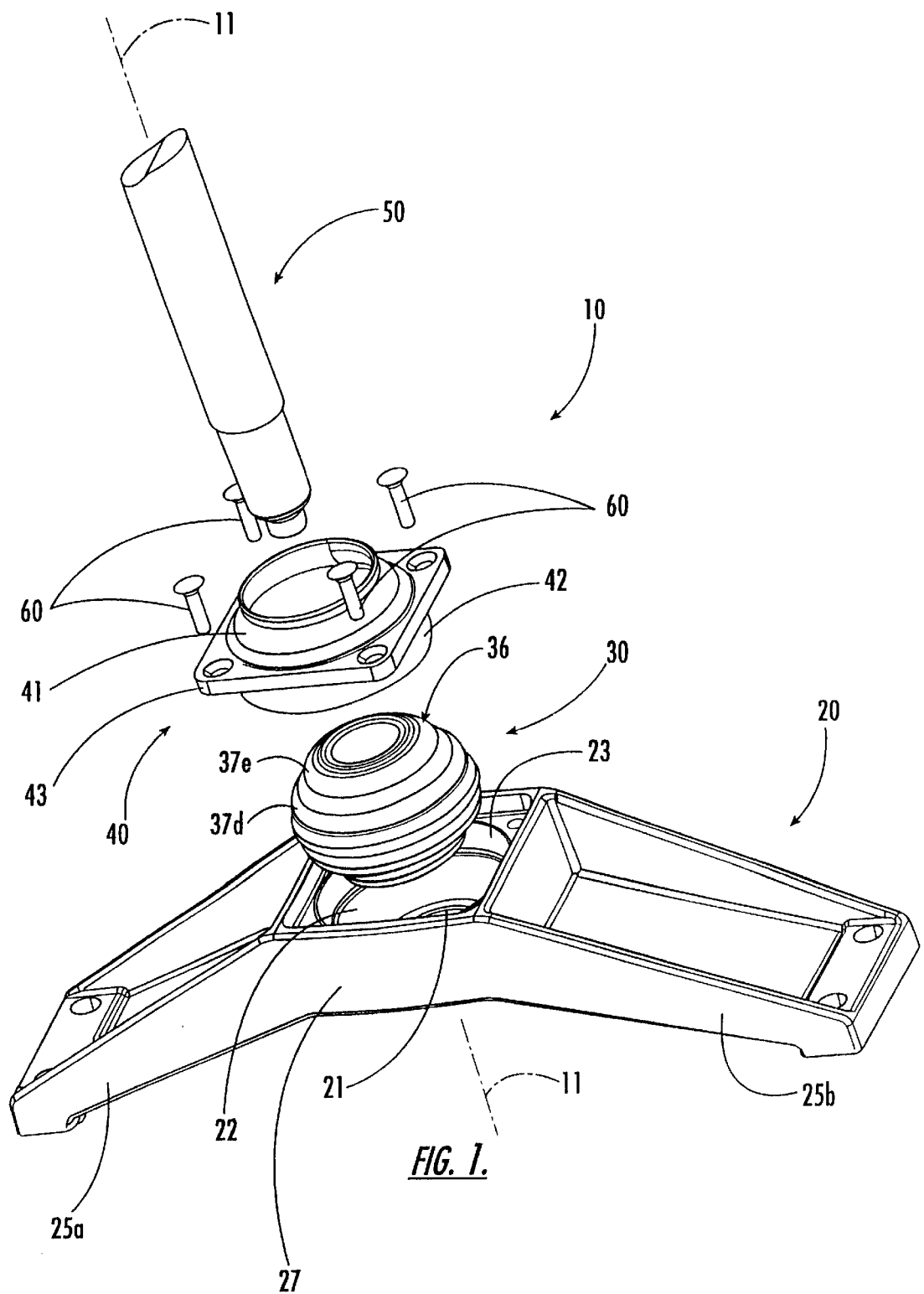
FIG. 1 is an exploded assembly view of the tilting mount of the present invention for use in combination with a base, a rigid cup, and a support member.

Now turning to the drawing figures wherein like parts are referred to by the same numbers in the several views, FIG. 1 illustrates assembly 10 that is generally comprised of base 20, mount 30 seated in the base, rigid cup 40 that substantially overlays mount 30, and moveable support member 50 with an end fixedly located in the mount 30. The mount 30 of the present invention controls the tilting or angular displacement of the support member 50 relative to base 20 and the mount supports cocking or tilting displacement of the support member at an angle relative to axis 11 at any position around axis 11.

For clarity, as the description proceeds, the terms "rocking", "cocking" or "tilting" shall mean the angular displacement of support member 50 relative to base 20 at any angle relative to axis 11 and the tilting, cocking or rocking may be effected at any position around axis 11. Additionally the relative positional terms "upper" and "lower" are used hereinafter to describe the orientation of the mount and assembly shown in the accompanying drawing figures. The positional terms should not be construed as limiting the scope of the claims of the invention to the relative positions described, and it should be understood that the mount of the present invention may support the movement of support member 50 relative to the base 20 from any suitable orientation with either mount end being the upper or lower end.

It is contemplated that the mount 30 will be most useful in a chair having a base 20 and a support member 50 that supports a seat (not shown), however the mount may be suitable for use generally in any assembly having a moveable member is movable relative to a base and wherein it is desirable to control the relative displacement between the base and the moveable member.

Figure 2:
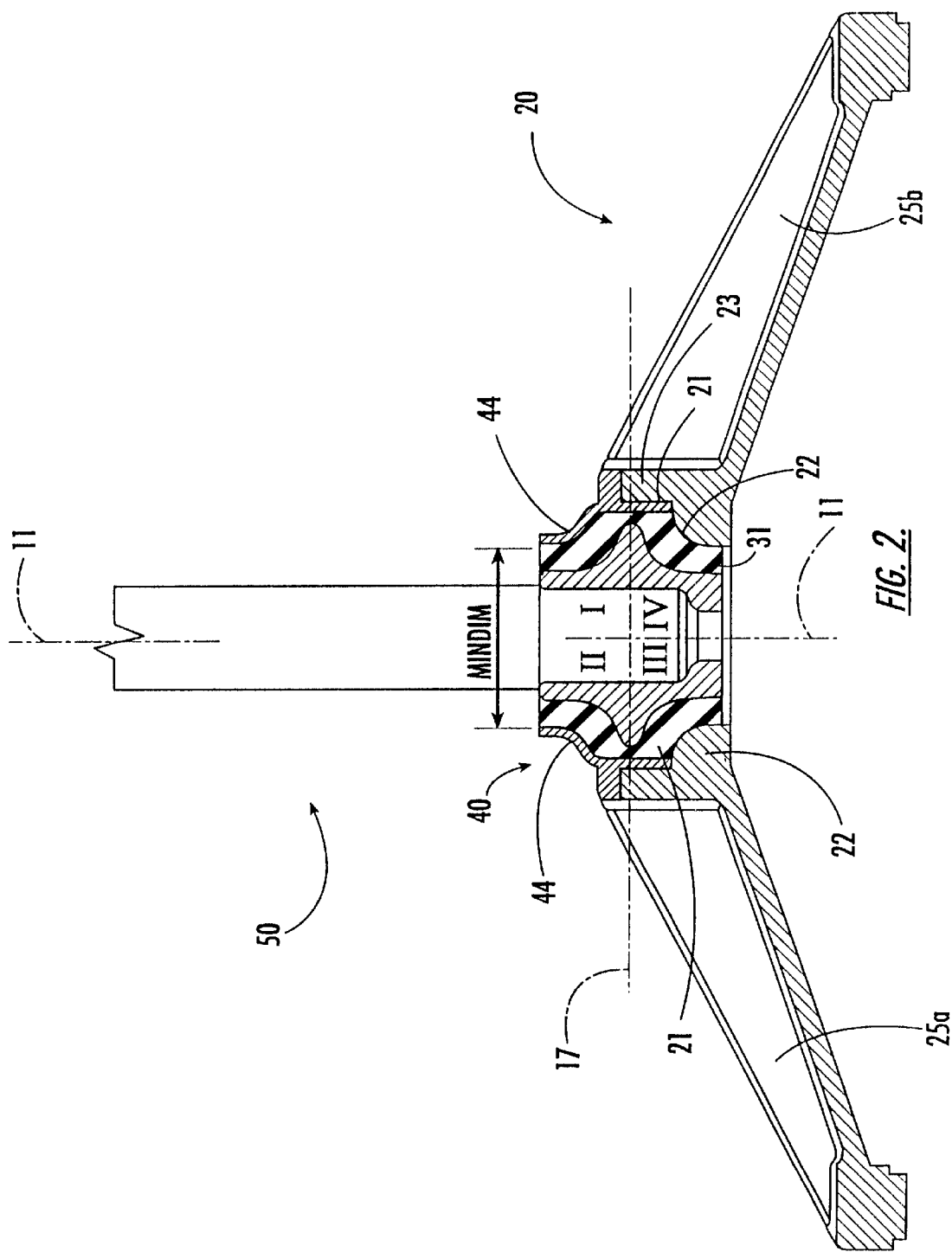
FIG. 2 is a longitudinal cross sectional view of the assembled tilting mount, base, rigid cup and support member of FIG. 1 with the support member shown in a vertical orientation with substantially no angular displacement relative to the base.
Figure 3:
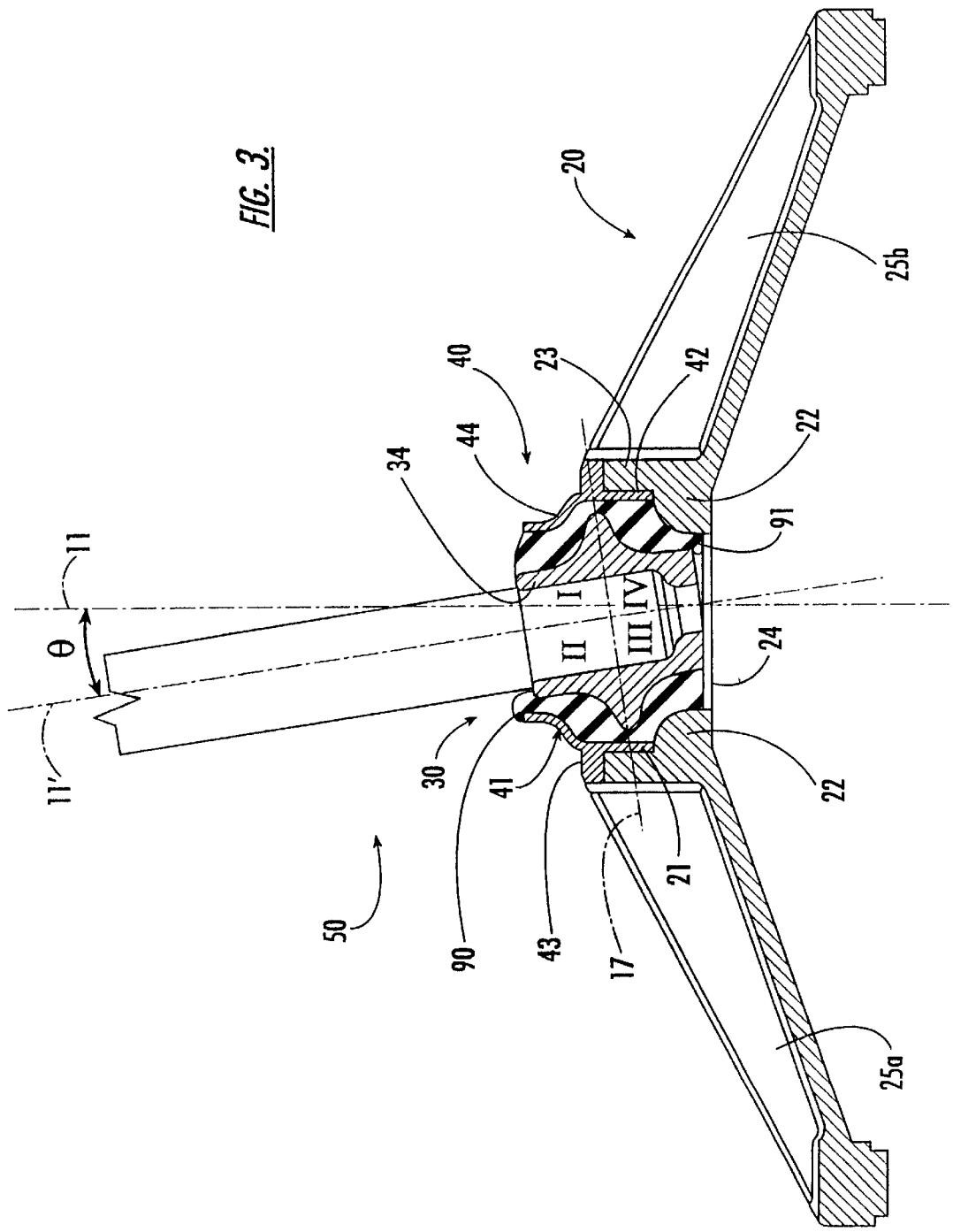
FIG. 3 is the longitudinal sectional view of FIG. 2 showing the support member displaced angularly in an exemplary angled orientation.

The base 20 includes a central hub 27 that defines cavity 21 that includes sidewall 23. An annular compression shoulder 22 is made integral with the cavity sidewall and floor and protrudes into the cavity area. As shown in FIGS. 2 and 3, the shoulder 22 has an arcuate cross section and extends completely around the lower portion of the cavity 21. Base 20 includes at least two base supports or feet identified as 25a and 25b in FIG. 1 that are made integral with the hub 27; and as shown in FIGS. 1, 2 and 3 the feet extend downwardly and outwardly from the hub to provide the required base support. Any number or configuration of feet may be used to support the expected loading of assembly 10.

Figure 4:
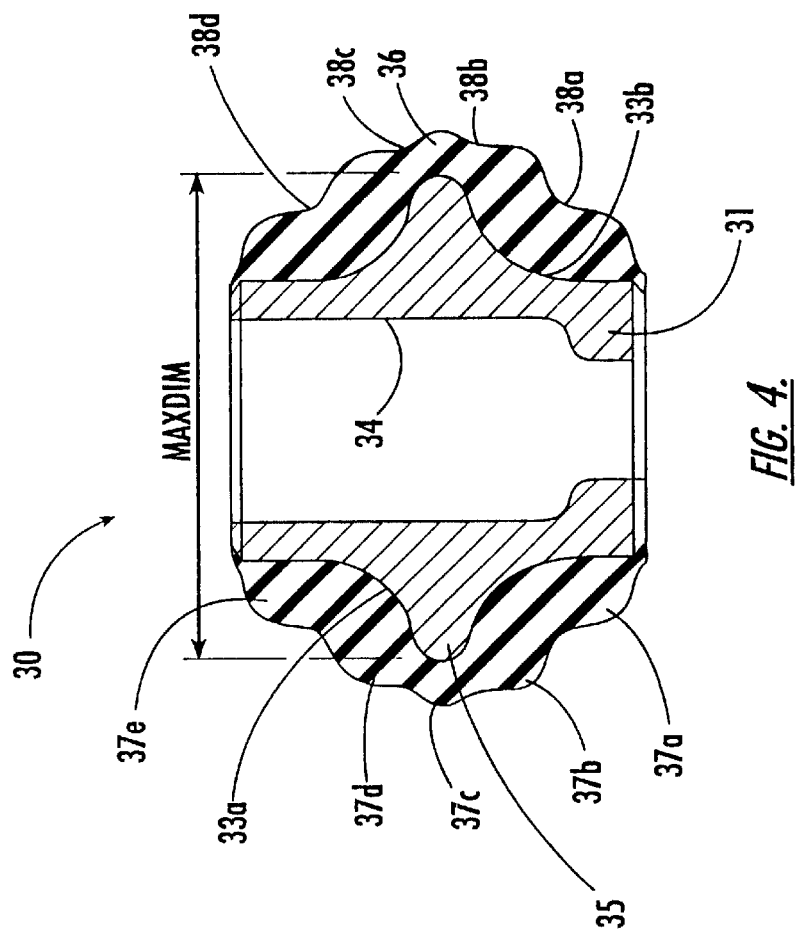
FIG. 4 is a longitudinal sectional view of the tilting mount of the present invention illustrating the uncompressed elastomeric member and inner sleeve.
Figure 5:
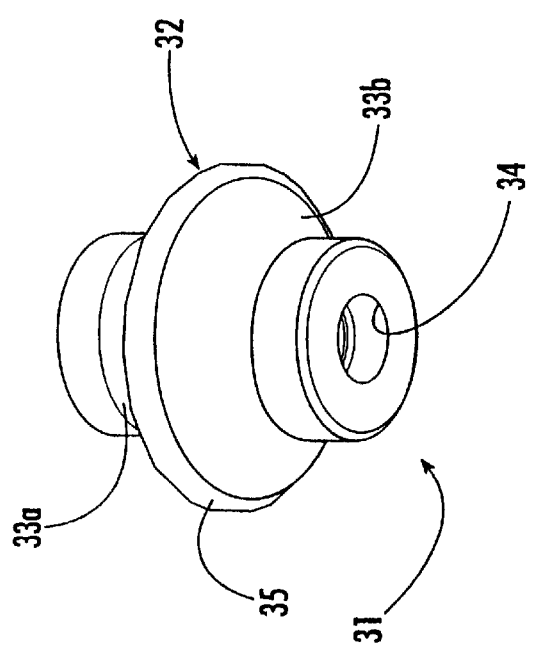
FIG. 5 is an isometric view of the inner sleeve member.

Mount 30 of the present invention is adapted to be seated in the cavity 21 and against shoulders 22. As shown in FIG. 4, the mount is comprised of an inner tubular sleeve 31 made integral with an outer elastomeric member 36. The tubular sleeve is rigid and has a stepped recess or bore 34 therethrough and an outwardly extending flange 32 formed along the outer sleeve wall. See FIG. 5. As shown in FIG. 4, the bore 34 has an inwardly tapered wall that significantly reduces in diameter at a first end. The end that includes the reduction in diameter may be identified as the lower end as the mount is seated in the cavity. See FIG. 2. The flange 32 is annular, extends completely around the sleeve body, and terminates in a rounded outer peripheral portion 35. It should be understood that the flange does not have to extend completely around the sleeve body.

In an alternate embodiment the tubular sleeve 31 may include a number of discrete flanges spaced around the sleeve body. The sleeve may include two, three or four flanges. Additionally, in an alternate embodiment one or more of the flanges may be made to extend radially outwardly a greater distance than the other flanges. If the radial dimensions of the flanges were varied in this way, the stiffness of the mount would be greater in the tilting directions and angles affected by the longer flange(s) than in the tilting directions and angles affected by the shorter flange(s).

Now returning to the description of the preferred embodiment of the present invention. As shown in FIG. 4, the flange also has a maximum dimension identified as MAXDIM. The MAXDIM dimension is equal to the diameter of the annular flange member. First and second arcuate concave portions 33a and 33b respectively are provided between the flange 32 and sleeve body, and the portions 33a and 33b extend completely around the sleeve body.

Elastomeric member 36 substantially covers the sleeve 31. The elastomeric member is most preferably made from a natural rubber however it should be understood that any material that provides the desired functionality and control of support member 50 may be used. The elastomeric member is made integral with the sleeve member through a conventional molding process well known to one skilled in the art and therefore additional description of the molding process is not required. The elastomeric member and sleeve may be bonded. The decision whether or not to bond the sleeve and elastomeric member together may depend on the mount stiffness required for a particular application. If the elastomeric member and sleeve are made integral and bonded together the mount will have greater stiffness than if the sleeve and member 36 are made integral but are not bonded.

FIGS. 1 and 4 show the mount with the elastomeric member uncompressed. The member 36 is substantially spherical, with a plurality of annular protuberances 37a, 37b, 37c, 37d, and 37e provided along the outer surface of the member 36. The protuberances have arcuate cross sections. Each protuberance is separated from the next adjacent protuberance by a valley 38a, 38b, 38c, and 38d. The combination of protuberances and valleys allows the elastomer to flow or to be displaced to open spaces in the cavity 21 when the elastomeric member is compressed during the assembly of support assembly 10, and in this way help to maintain a substantially constant elastomer thickness when the member 50 is in the substantially vertical orientation shown in FIG. 2. In an alternate embodiment mount protuberance 37c is not included along the elastomer outer surface. In such an embodiment, protuberances 37b and 37d would be joined by a substantially planar surface free from protuberances.

Unitary rigid cup 40 substantially overlays the mount seated in cavity 21 as shown in FIGS. 2 and 3. Upwardly extending annular wall 41 and downwardly extending annular wall 42 are made integral with outwardly extending flange 43. As shown in FIGS. 2 and 3, the lower edge surface of the downwardly extending wall 42 is seated on the compression shoulder 22 and the flange 43 is located on the top of wall 23 when the rigid cup is assembled with the mount 30 and base 20.

An arcuate upper compression shoulder 44 is provided along the upwardly extending annular wall. As shown in FIG. 2, the compression shoulder is directed towards the interior of the cup. As shown in FIG. 3 the shoulder 44 transitions the upper wall 41 inward to a minimum dimension MINDIM shown in FIG. 2. The MINDIM dimension represents the diameter defined by the wall 41 at the upper end of the cup. The value of MIDIM is always less than the value of MAXDIM and in this way if the mount fails, the interference between the flange 32 and shoulder 44 prevents the member 50 from disconnecting from the base 20. By this interference, a simple means for preventing undesirable disconnection of the support member from the base is provided. Additionally, in the event of such failure, the interference between the flange 32 and shoulders 22 and 44 limits the angular displacement of the support member 50.

As shown in FIG. 2, the outer surfaces of the arcuate upper and lower compression shoulders 44 and 22 and the concave portions 33a and 33b adjacent to shoulders 44 and 22 respectively are substantially parallel and are offset by the substantially constant thickness of the elastomer when the support member is in the vertical position.

For purposes of describing the preferred embodiment of the invention elongate moveable member 50 is a conventional gas spring however the member 50 may be any suitable elongate member. A portion of the member is shown in FIGS. 1, 2 and 3. A stepped end of the support member is inserted into bore 34 until it is locked in place in the bore by a conventional taper lock between the gas spring housing and the inwardly tapered wall of the bore 34.

Assembly and operation of the support assembly 10 will now be described.

The tilting mount 30 is manufactured using a conventional molding method and after the mount is manufactured the integral combination of the sleeve 31 and elastomeric member 36 is seated in the cavity 21 and is supported on lower compression shoulder 22. The end of support member 50 may be inserted in the bore 34 either before or after the mount is seated in the cavity. The elastomeric member 36 is precompressed as the cup 40 is assembled with the mount and base. After the cup is properly seated to overlay the mount, the cup is then fastened to the base by conventional fastening means 60 such as bolts, screws or the like.

As the cup is fastened to the base, the mount is precompressed. The most significant portion of the precompression occurs between the flange 32 and the upper and lower compression shoulders 22 and 44. Additional precompression occurs between the concave portions 33a, 33b and the respective compression shoulders 22 and 44.

In assembly 10, of the present invention the elastomeric member 36 is not bonded to the cup or base and as a result, the mount 30 is in compression and no portion of the mount is in tension. By not subjecting the mount to any tensile forces, the useful life of the mount 30 is greater than prior art mounts that are subjected to tensile forces.

During the precompression assembly step discussed above, the protuberances 37a–e are compressed and the elastomer comprising the protuberances is displaced into the valleys 38a–d and into other open spaces in cavity 21. As a result of such displacement, as shown in FIG. 2 the assembled elastomeric member has substantially equal thickness in the cavity.

When the support member is tilted or otherwise displaced angularly, the mount limits the member displacement by generally increasing the precompression forces in volumes or portions of the elastomeric member that are diagonally opposed. Conversely, in response to the angular displacement, the precompression forces in other diagonally opposed volumes or portions of the elastomer are generally reduced.

In order to understand how the mount of the present inventions achieves the desired limited displacement of member 50, it is useful to describe the mount in terms of a number of like compression portions. For purposes of this description the operation of the mount 30 will be described in terms of four like compression portions identified as I, II, III and IV in FIGS. 2 and 3. Each portion extends for about 180° about axis 11 and above or below axis 17. Portions I and II are located above axis 17 and portions III and IV are located below axis 17 with portion pair I and III, and portion pair II and IV being respectively diagonally opposed.

Although four compression portions are illustrated the means for limiting the member displacement may be described using any number of compression portions. As the description of the movement of support member 50 proceeds, it will be evident that portions of the elastomeric member experience increases in precompression forces and portions of the elastomeric member experience decreases in precompression forces. The quadrants are used solely to describe and clearly illustrate the general concept that diagonally opposed portions of the mount generally experience increases or reductions in the precompression forces.

In operation, as the support member is displaced angularly or rocked, the compressive forces in the diagonally opposed elastomeric volumes of portions I and III, or II and IV where the flange 32 is moved towards the compression shoulder 22 or 44 are increased; and conversely, in the diagonally opposed portions I, and III, or II and IV where the flange is moved away from the compression shoulders the elastomeric portions are moved out of compression. Describing the change in compression forces by way of example, turning to FIG. 3, as the support member 50 is displaced counterclockwise relative to the base by an angle θ, the elastomer is compressed between the segments of flange 32 and shoulder 22 in compression portion III and between segment of flange 32 and compression shoulder 44 in compression portion I. The precompression forces are increased in diagonally opposed portions I and III as the flange is moved towards shoulder segments 44 and 22 in respective portions I and III. Additionally, an elastomeric bulge volume 90 protrudes from between the segments of sleeve 31 and cup wall 41 in portion II. See FIG. 3. The bulge volume of elastomer is displaced upwardly as the mount is tilted by the angle θ and axis 11 is moved to 11'. A like bulge volume would have been created between the portions of the cup wall 41 and sleeve 31 in portion I had the support member been displaced clockwise about axis 11. A bulge volume is also produced in portion IV between the sleeve and compression shoulder 22. In portion III, the resultant thickness of the elastomer volume is greater at the bottom of the portion III than between the flange 32 and shoulder 22 as the compressive forces displace the elastomeric volume downwardly to the lower portion of the cavity.

The volumes of elastomeric member in diagonally opposed compression portions II and IV are moved out of compression, and the precompression forces are generally reduced in these portions. As shown in FIG. 3, as the support member is displaced by angle θ, the flange is moved away from compression shoulders 44 and 22 respectively, thereby creating a larger volume between the flange and shoulders and resulting in a reduction in the precompression forces in diagonally opposed portions II and IV. As shown in FIG. 3.

If the support member is moved angularly clockwise relative to base 20, the precompression forces in diagonally opposed portions II and IV will generally be increased and the precompression forces in the diagonally opposed elastomeric member portions I and III will generally be decreased. The elastomeric member will be further compressed between the segments of flange 32 and shoulder 44 in portion II and the segments of shoulder 22 and flange 32 in portion IV.

It should be understood that although the increases and decreases in compression forces that result when the member is displaced are presented in terms of discretely and completely affecting the compressive forces in full volume comprising singular compressive portions I, II, III, or IV, minority volumes within the compressive portions may experience changes in compression forces that are opposite to the changes generally recognized by the portion volume. A portion that generally experiences an increase in compressive forces during member movement may also include a minority volume that experience a decrease in compression forces, and conversely a portion that generally experiences a decrease in compression forces may also include a minority volume that recognizes an increases in compressive forces. However, in response to angular displacement of member 50, the portions generally experiencing an increase in the compressive forces and the portions generally experiencing a decrease in compression forces will always be diagonally opposed.

The tilting or angular displacement of the support member is limited by snubbing that occurs in cavity 21. The compressive forces in the elastomeric member increase until the affected diagonally opposed compressive portions can no longer be compressed and in this way the displacement of the member is snubbed thereby preventing further displacement. As a result, a complex mechanism is not required to limit the displacement of member 50. Mount 30 effectively replaces complex stop mechanisms of prior art mount assemblies.

Figure 6:
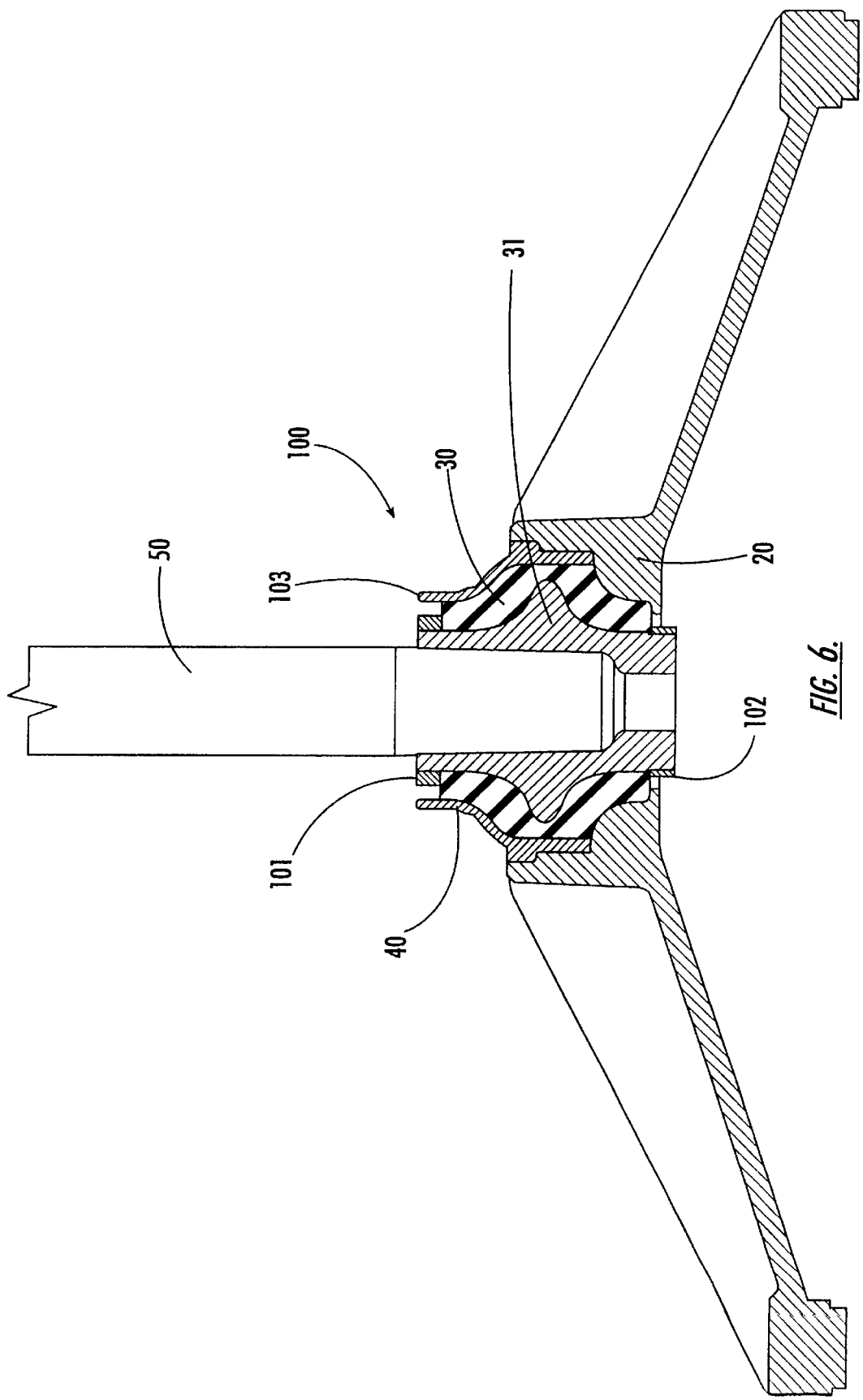
FIG. 6 is a longitudinal sectional view of an alternate embodiment tilting mount.

An alternate embodiment tilting mount assembly 100 is shown in FIG. 6. In the alternate embodiment assembly, the mount 30, base 20 and support member 50 are the same as described in the description of the first preferred embodiment of the invention. The sleeve 31 and cup 40 are substantially the same as previously described. In the alternate embodiment assembly 100 the ends of the inner sleeve are extended so that when the sleeve and mount 30 are seated in the base, the lower end extends outward from the base 20 and the upper end extends beyond the upper face of mount 30. Additionally, the upper edge of cup 40 is extended at 103 and is substantially parallel to the upper sleeve end. Like the upper sleeve end, the extended cup end 103 extends beyond the upper face of the mount member 30.

Upper and lower annular limiting rings 101 and 102 are respectively fitted onto the extended portions of the upper and lower sleeve ends. The rings are pressed onto the sleeve ends. The rings serve to limit the tilting angle of the mount. As shown in FIG. 6, the thicknesses of the rings are not the same. Ring 101 has a greater thickness than ring 102. However, the radial distances separating the ring 102 from base 20 and ring 101 from cup 103 are substantially the same. By this arrangement, portions of both rings will serve to limit displacement of member 50 when it has traveled the maximum tilt angle.

A portion of ring 101 engages the extended portion of cup 40 and a portion of ring 102 engages base 20 when the support member reaches the maximum permissible tilt angle. Diagonally opposed sections of the rings 101 and 102 engage the cup and base when the support 50 is displaced to the maximum tilt angle. For example referring to the displacement shown in FIG. 3, if the angle θ represents the maximum permissible angular displacement for member 50, the portion of ring in portion II would engage extended cup 40 and the portion of ring in portion IV would engage base 20. With the exception of rings 101 and 102 the alternate embodiment mount 100 serves to limit displacement of support member 50 in the same manner as previously described hereinabove and therefore further explanation of the operation of the alternate embodiment assembly 100 is not required.

Although two rings are shown in FIG. 6 it should be understood that the mount assembly 100 may only include either the upper or lower ring member.

While the tilting mount herein described includes a preferred embodiment of this invention, it is to be understood that the invention is not limited to this precise form of the mount and that changes may be made therein without departing from the scope of the invention which is defined in the following claims.

What i claim as my invention is:

1. A mount for controlling angular displacement of a support member relative to a base, the mount comprising: a tubular sleeve member movable about a mount axis in response to relative angular displacement of the support member and base, said tubular sleeve member comprising an outer wall and an outwardly directed flange along the outer wall the flange extending outwardly from the outer wall and terminating at an outer peripheral portion located away from said outer wall, said mount also comprising an elastomeric member that substantially covers the sleeve member, and wherein when angular displacement is imparted on the sleeve, the flange compresses portions of the elastomeric member to thereby limit angular displacement of the sleeve wherein the elastomeric member has an outer surface and a number of protuberances along the outer surface.

2. The mount as claimed in claim 1 wherein each of the protuberances has a semicircular cross section and each protuberance is annular.

3. The mount as claimed in claim 1 wherein each protuberance is separated from an adjacent protuberance by a valley.

4. The mount as claimed in claim 1 wherein the portions of the elastomeric member compressed by the flange during angular displacement of the sleeve are diagonally opposed.

5. A mount for controlling angular displacement of a support member relative to a base, the mount comprising: a tubular sleeve member movable about a mount axis in response to a relative angular displacement of the support member and base, said tubular sleeve member comprising an outer wall and an outwardly directed flange along the outer wall the flange extending outwardly from the outer wall and terminating at an outer peripheral portion located away from said outer wall, said mount also comprising an elastomeric member that substantially covers the sleeve member, and wherein when angular displacement imparted on the sleeve, the flange compresses portions of the elastomeric member to thereby limit angular displacement of the sleeve wherein the flange is annular and the flange has a semicircular outer peripheral portion.

6. A mount for controlling angular displacement of a support member relative to a base, the mount comprising: a tubular sleeve member movable about a mount axis in response to relative angular displacement of the support member and base, said tubular sleeve member comprising an outer wall and an outwardly directed flange along the outer wall the flange extending outwardly from the outer wall and terminating at an outer peripheral portion located away from said outer wall, said mount also comprising an elastomeric member that substantially covers the sleeve member, and wherein when angular displacement is imparted on the sleeve, the flange compressed portions of the elastomeric member to thereby limit angular displacement of the sleeve wherein the mount is substantially spherical.

7. A mount for controlling angular displacement of a support member relative to a base, the mount comprising: a tubular sleeve member movable about a mount axis in response to relative angular displacement of the support member and base, said tubular sleeve member comprising an outer wall and an outwardly directed flange along the outer wall the flange extending outwardly from the outer wall and terminating at an outer peripheral portion located away from said outer wall, said mount also comprising an elastomeric member that substantially covers the sleeve member, and wherein when angular displacement is imparted on the sleeve, the flange compresses portions of the elastomeric member to thereby limit angular displacement of the sleeve wherein the mount comprises concave portions that extend between the flange and sleeve.

8. The mount as claimed in claim 7 wherein the concave portions extend annularly.

9. A mount for controlling angular displacement of a support member relative to a base, the mount comprising: a tubular sleeve member movable about a mount axis in response to relative angular displacement of the support member and base, said tubular sleeve member comprising an outer wall and an outwardly directed flange along the outer wall the flange extending outwardly from the outer wall and terminating at an outer peripheral portion located away from said outer wall, said mount also comprising an elastomeric member that substantially covers the sleeve member, and wherein when the angular displacement is imparted on the sleeve, the flange compresses portions of the elastomeric member to thereby limit angular displacement of the sleeve wherein the sleeve and elastomeric member are bonded together.

10. An assembly comprising:

(a) a base which defines a cavity;

(b) a mount comprising an elastomeric member and a sleeve having a flange, the sleeve comprising an outer wall, the flange extending outwardly from the outer wall and terminating at an outer peripheral portion away from said outer wall, the mount further comprising a first mount compression portion and a second mount compression portion, the mount being seated in the cavity; a moveable member supported by the mount, the sleeve being moveable with the moveable member; and (c) a cup member seated in the cavity and overlaying a portion of the elastomeric member, and wherein as the moveable member is displaced, the first portion of the mount is compressed between the flange and a portion of the cavity wall and the second portion of the mount is compressed between the flange and a portion of the cup member.

11. The assembly as claimed in claim 10 wherein the sleeve has first and second ends, the assembly further comprising first and second limiting rings located at the first and second sleeve ends.

12. The assembly as claimed in claim 11 wherein the first and second portions are diagonally opposed.

13. The assembly as claimed in claim 11 further comprising third and fourth mount portions, and wherein as the movable member is displaced the third and fourth mount portions are moved out of compression.

14. The assembly as claimed in claim 13 wherein the third and fourth portions are diagonally opposed.

15. The assembly as claimed in claim 11 wherein the mount elastomeric member and sleeve are only in compression.

16. The assembly as claimed in claim 11 wherein the sleeve and elastomeric member are bonded together.

17. The assembly as claimed in claim 11 wherein the cavity is defined by a sidewall, and a floor, the base further comprising a lower compression shoulder that extends between the sidewall and the floor in the cavity.

18. The assembly as claimed in claim 17 wherein the first mount portion is compressed between the flange and the lower compression shoulder.

19. The assembly as claimed in claim 17 wherein the rigid cup member is seated on the lower compression shoulder.

20. The assembly as claimed in claim 17 wherein the lower compression shoulder is comprised of an annular member with an arcuate cross section.

21. The assembly as claimed in claim 10 wherein the cup includes an upper compression shoulder.

22. The assembly as claimed in claim 21 wherein the second mount portion is compressed between the flange and the upper compression shoulder.

23. The assembly as claimed in claim 11 wherein the elastomeric member has a substantially constant thickness.

24. The assembly as claimed in claim 11 wherein the flange is comprised of an endless annular member.

25. The assembly as claimed in claim 11 wherein the cup defines a minimum dimension, and the flange defines a maximum dimension, the maximum flange dimension being greater than the minimum dimension defined by the cup.

26. The assembly as claimed in claim 11 wherein the sleeve has a first end, and wherein a first limiting ring is located at the first end.

27. The assembly as claimed in claim 11 wherein the sleeve has a second end, and wherein a second limiting ring is located at the second end.

* * * * *